Patented Feb. 22, 1944

2,342,119

UNITED STATES PATENT OFFICE 2,342,119

ESTERS OF NITRO-FATTY ACIDS

Herman A. Bruson, Philadelphia, Pa., assignor to The Resinous Products & Chemical Company, Philadelphia, Pa.

No Drawing. Application July 16, 1941,
Serial No. 402,630

6 Claims. (Cl. 260—485)

This invention relates to condensation products of acrylic acid esters and mononitroalkanes having a reactive hydrogen-bearing carbon atom contiguous to the nitro group.

According to this invention nitroalkanes having one nitro group and a reactive hydrogen-bearing carbon atom contiguous to the nitro group are reacted with acrylic acid esters in the presence of an alkaline condensing agent to replace one or more of the active hydrogen atoms of said reactive group by an esterified β-carboxyethyl radical.

The reaction takes place readily with the mononitroalkanes. Of particular interest for the purpose because of their availability are the following: Nitromethane, nitroethane, 1-nitropropane, 2-nitropropane, the nitrobutanes, and higher homologues thereof.

As alkaline condensing agents there may be mentioned the oxides, hydroxides, amides, hydrides, or alcoholates of the alkali metals, the alkali metals themselves, and strongly basic non-metallic hydroxides, such as quaternary ammonium hydroxides. These may be employed in inert solvents or suspending agents for the reactants as, for example, dioxane, benzene, or ether, or in media less reactive than the nitro compounds, such as tertiary butanol. The more stable alkalies, such as sodium hydroxide, potassium hydroxide, trimethyl benzyl ammonium hydroxide, dimethyl dibenzyl ammonium hydroxide and the like can be used in aqueous solution for the purpose.

The quantity of alkaline condensing agent used is small, amounts of the order of 0.5 to 10% on the weight of the reactants usually being sufficient. The condensation occurs readily at temperatures between about 0° and about 80° C., preferably from about 30° to 60° C., and is often exothermal so that cooling is advantageous in order to prevent undesired side reactions. Depending upon the number of available reactive hydrogen atoms on the carbon atoms contiguous to the nitro group, one or more

—CH$_2$—CH$_2$—COOR groups can be introduced, R being the organic radical of a monohydric alcohol. This organic radical may be aliphatic, aryl, aralkyl, cycloalkyl, or heterocyclic.

The products are useful as insecticides and as intermediates for the preparation of amino acids, amino alcohols, nitroacids, and nitro amides for use in the preparation of synthetic resins, plasticizers, and drugs.

The following examples illustrate this invention.

*Example 1*

A mixture consisting of 44.5 g. of 2-nitropropane, 25 cc. of tertiary butanol and 5 g. of aqueous 40% trimethyl benzyl ammonium hydroxide was stirred while 50 g. of ethyl acrylate was added dropwise thereto during one hour. The reaction temperature was maintained between 35° and 40° C. by external cooling. The mixture was stirred thereafter for five hours at 25–30° C. and then made acidic to litmus by the addition of a slight excess of dilute hydrochloric acid. The product was then mixed with an equal volume of ethylene dichloride and washed several times with water. The washed ethylene dichloride layer was then evaporated to dryness under reduced pressure at 90–95° C. The residue was a blue oil weighing 91 g. Upon distillation in high vacuo it boiled at 89–90° C./1 mm. The yield was 78 g. of a pale blue oil ($d^{25}$ 1.0775 and $N_D^{25}$ 1.4383) which upon standing became pale green. Its formula is:

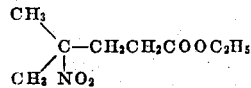

*Example 2*

43 g. of methyl acrylate was added dropwise to a mixture of 44.5 g. of 2-nitropropane, 25 cc. of dioxane and 5 g. of aqueous 40% trimethyl benzyl ammonium hydroxide while the reaction mixture was stirred and cooled to 35–40° C. The mixture was stirred thereafter for six hours, then acidified with dilute hydrochloric acid and thoroughly washed with water. Upon distillation in vacuo, γ-methyl-γ-nitro-methyl valerate came over at 85–90° C./1–2 mm. as a pale bluish-green oil in 86% of the theoretical yield. The compound has the formula:

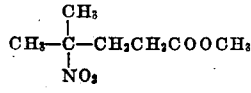

*Example 3*

To a well stirred mixture of 44.5 g. of 1-nitropropane (0.5 mol), 5 g. of aqueous 40% trimethyl benzyl ammonium hydroxide in 15 cc. of tertiary butanol there was added during 45 minutes, while the temperature of the reaction mixture was held at 35–40° C., 50 g. of ethyl acrylate (0.5 mol). At this point 5 g. of additional aqueous 40% trimethyl benzyl ammonium hydroxide was added, followed by the dropwise addition of another 50 gram portion of ethyl acrylate during 45 minutes. After all had been added, the mixture was stirred for six hours at 25–30° C. It was then acidified with dilute hydrochloric acid, taken up in ethylene dichloride and washed thoroughly with water. The ethylene dichloride layer was separated and evaporated to dryness in vacuo on a steam bath. The residual oil weighing 112 g. was distilled in high vacuo. Two fractions were obtained, one boiling at 90–91° C./1 mm. as a colorless oil, consisting of γ-nitro-ethyl hexoate

and the other consisting of γ-nitro-γ-ethyl-pimelic acid diethyl ester

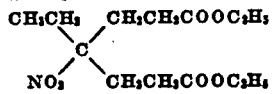

distilling at 160–164° C./1 mm. as a pale yellow oil.

*Example 4*

50 g. of ethyl acrylate (0.5 mol) was added dropwise to a stirred solution of 19 g. of nitroethane (0.25 mol), 3 g. of aqueous 40% trimethyl benzyl ammonium hydroxide, and 10 cc. of tertiary butanol at 35–40° C. The mixture was then stirred for six hours at 25° C., acidified with dilute hydrochloric acid, taken up in ethylene dichloride and thoroughly washed with water. The ethylene dichloride layer was separated and evaporated to dryness at 85° C. under reduced pressure (50 mm.). The residual oil, weighing 62 g., was distilled in high vacuo.

The desired γ-methyl-γ-nitro-diethyl pimelate distilled over at 154–155° C./1 mm. as a faintly bluish-green oil in a yield of 41 g. Its formula is

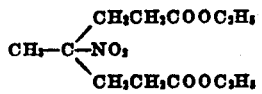

*Example 5*

86 g. of methyl acrylate was added dropwise to a stirred solution of 37.5 g. of nitroethane, 50 g. of dioxane, and 3 g. of aqueous 40% trimethyl benzyl ammonium hydroxide while the reaction mixture was cooled to 35–40° C. After all the methyl acrylate had been added during the course of 75 minutes, the mixture was stirred for six hours and then acidified with dilute hydrochloric acid. The oil was taken up in ethylene dichloride, washed thoroughly with water and distilled in vacuo. The desired γ-methyl-γ-nitro-dimethyl pimelate (90 g.) came over at 153–155° C./1 mm. as an almost colorless oil; $N_D^{25}$ 1.4589; $d^{25}$ 1.1879.

*Example 6*

Methyl acrylate (86 g.) was added dropwise during a period of one and one-half hours to a stirred solution of 61 g. of nitromethane, 60 cc. of dioxane, and 7 g. of aqueous 40% trimethyl benzyl ammonium hydroxide while the reaction mixture was maintained at 30–37° C. by external cooling. The mixture was stirred thereafter for five hours at 25–30° C. and then made faintly acid toward litmus with dilute hydrochloric acid. The product was mixed with an equal volume of ethylene dichloride, and then washed thoroughly with water. The ethylene dichloride layer was separated and distilled under reduced pressure. The main fraction distilled at 160–170° C./1 mm. as a pale green oil. The yield was 48 g. This consisted essentially of γ-nitro-dimethyl pimelate:

The residue (35 g.) consisted of an oil having the composition:

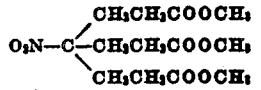

It could not be distilled in vacuo at 1 mm. without decomposition.

In the above examples the methyl acrylate or ethyl acrylate can be replaced mol for mol by any other esters of acrylic acid to yield the corresponding esters of nitro fatty acids. For example, one may use the propyl, butyl, amyl, isoamyl, octyl, dodecyl, cetyl, oleyl, methallyl, allyl, chloroethyl, methoxyethyl, ethoxyethyl, butoxyethyl, phenoxyethyl, ter-butylphenoxyethyl, phenyl, chlorophenyl, benzyl, o-chlorobenzyl, cyclohexyl, tetrahydrofurfuryl, dimethylaminoethyl, dimethylaminopropyl, or other ester of acrylic acid. Of particular interest are the new compounds of the general formula:

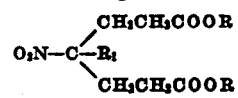

wherein $R_1$ is hydrogen or alkyl, and R is a hydrocarbon or substituted hydrocarbon group. These compounds are obtainable by the present invention as high boiling liquids useful as plasticizers for esters or ethers of cellulose and for other organic plastics.

I claim:

1. A process for introducing an esterified β-carboxyethyl group in a mononitroalkane having at least one reactive hydrogen atom attached to the carbon atom contiguous to the nitro group, which comprises reacting said nitroalkane with an ester of acrylic acid in the presence of a quaternary ammonium hydroxide.

2. A process for introducing an esterified β-carboxyethyl group in a mononitroalkane having at least one reactive hydrogen atom attached to the carbon atom contiguous to the nitro group, which comprises reacting said nitroalkane with an ester of acrylic acid in the presence of trimethyl benzyl ammonium hydroxide.

3. As a new compound, a γ-nitro-pimelic acid ester having the formula:

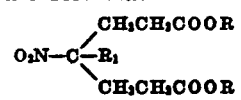

wherein $R_1$ is a member of the group consisting of hydrogen and alkyl and R is a lower alkyl group.

4. As a new compound, γ-methyl-γ-nitro-diethyl pimelate:

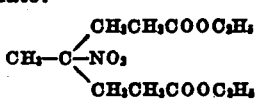

5. As a new compound, γ-ethyl-γ-nitro-diethyl pimelate:

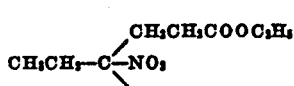

6. As a new compound, γ-nitro-dimethyl pimelate:

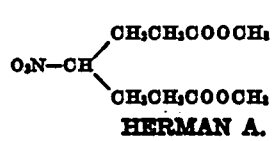

HERMAN A. BRUSON.